March 2, 1965  M. C. LASKY  3,171,202
DENTAL BRIDGE AND MOUNTING THEREFOR
Filed Oct. 16, 1961  2 Sheets-Sheet 1

INVENTOR.
MERVYN C. LASKY
BY
ATTORNEYS

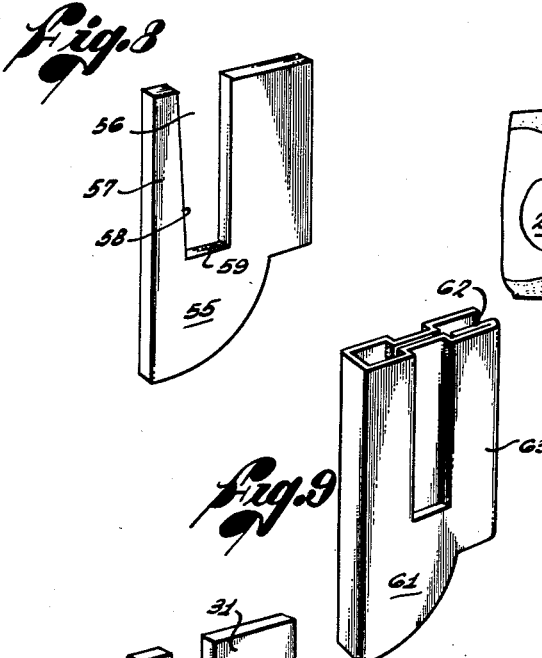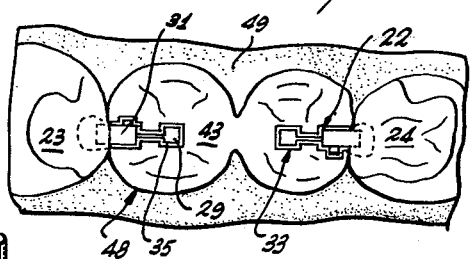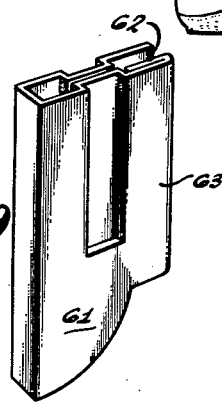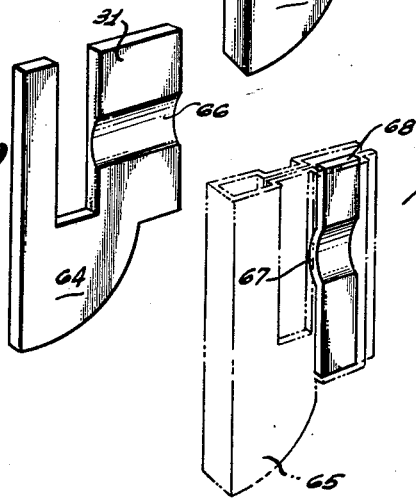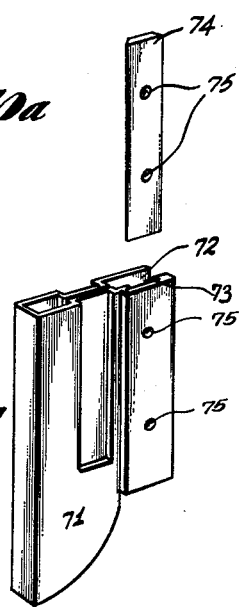

United States Patent Office 3,171,202
Patented Mar. 2, 1965

3,171,202
DENTAL BRIDGE AND MOUNTING THEREFOR
Mervyn C. Lasky, 1307 N. La Brea Ave.,
Los Angeles, Calif.
Filed Oct. 16, 1961, Ser. No. 145,096
13 Claims. (Cl. 32—5)

The present invention relates to mountings for partial dentures or dental bridges, and more particularly to mountings for removable and semi-fixed bridges.

In the mounting of dental bridges it is desired to anchor the bridge at one or both ends to natural teeth which serve as abutments or piers to support the bridge therefrom. In such mountings it is desired to provide for maximum strength in the bridge support, minimum wear, minimum invasion of the natural abutment teeth and a definite and strong stop gingivally to prevent the pontic pressing into the gum tissue.

It is, therefore, an object of the present invention to provide an improved mounting for a dental bridge.

Another object of this invention is the provision of an improved dental bridge mounting providing maximum support and great resistance to lateral stress.

A further object of this invention is the provision of a dental bridge mounting providing low cost of manufacture and ease of construction and repair by the dentist, and simplified handling and thorough cleaning by the patient.

A still further object of this invention is the provision of a dental bridge mounting giving improved stress breaking action.

These and other objects and features of the invention will be readily apparent to those skilled in the art from the following specification and the appended drawings illustrating certain preferred embodiments of the invention, in which:

FIGURE 7 is a plan or occlusal view of the dental bridge and mounting according to the present invention;

FIGURE 8 is a perspective view of a modified form of male member of particular usefulness when the bridge is supported at only one end as in distal extension cases;

FIGURE 9 is a perspective view of a modified form of female member for a bridge mounting, similar to FIGURE 3 but showing a modified construction for wear compensation;

FIGURE 10 is a perspective view of a further modified form of male member for a bridge mounting;

FIGURE 10a is a perspective view of a modified female member cooperating with the male member of FIGURE 10, with parts shown in phantom; and FIGURE 11 is an exploded perspective view of a further modified female member for a bridge mounting having a replaceable wear compensating element.

Figure 1:
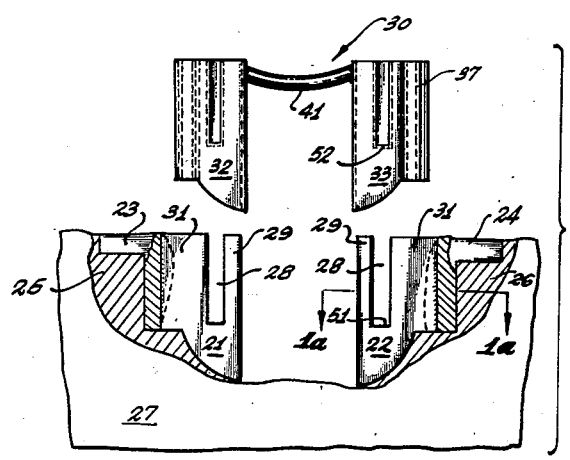
FIGURE 1 is an elevational view, partly in section, of the male and female members of the bridge mounting, shown exploded and with the male members secured to teeth inlays.
Figure 4:
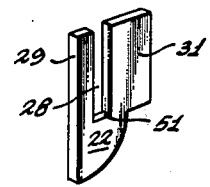
FIGURE 4 is a perspective view of one of the male members of the bridge mounting.

As shown in FIGURE 1, the bridge mounting according to the present invention is in an intermediate form in its process of manufacture, with the male members 21 and 22 soldered to inlays 23 and 24, respectively, and with the inlays supported in mockups 25 and 26 in a mold or form 27. The male members 21–22 are in the form of plates, as shown in FIGURE 4, having longitudinal slots 28 therein providing securing posts 29 spaced from guide and attachment portions 31. The male members 21–22 are thus of substantially U-shape with the legs of the U formed by the post 29 and the attachment portion 31. The attachment portions 31 are soldered at their edges to the inlays to be fitted in the natural tooth abutments.

Figure 3:
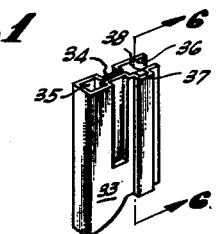
FIGURE 3 is a perspective view of one of the female members of the bridge.
Figure 2:
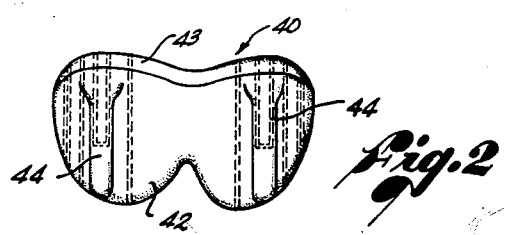
FIGURE 2 is an elevational buccal view of the removable bridge according to the present invention before the assembly of the facings of the pontics thereon.

The female members cooperating with the male members 21 and 22 are shown at 32 and 33 and, in perspective, in FIGURE 3. Each female member is formed of sheet metal, grooved as shown in the figures, and return bent and soldered together at the abutting faces 34. This forms a longitudinally extending passage 35, rectangular in cross section and sized to receive the post 29 in closely fitting relation. The connecting faces 34 are received within the slot 28 when the male and female members are nested. At the edge of the female member opposite the passage 35 there is provided an elongated slot 36 which embraces the flat guiding portion 31 of the male members when the members are nested together. Thus the female members present substantially U-shaped sockets receiving the male members.

One face of the slot 36 is bent to form a groove 37 within which is disposed an adjusting strip 38 secured to the female member only adjacent the bottom thereof, as at 39, so that it may be readily bent outwardly of the slot 37 at its unattached end to ensure engagement with the portion 31 of the cooperating male member and thus compensate for wear between the adjacent surfaces of the male and female members.

In the construction of the bridge by the dentist or technician, the male members 21 and 22 are soldered to the inlays 23 and 24 mounted in the models 25 and 26 on the form 27, the models 25 and 26 corresponding to the natural abutment teeth which are to support the bridge. The female members 32 and 33 are then placed over the male members 21 and 22 and are joined together, as by soldering, by a bridging element 41, to form the rigid assembly 30 shown at the upper portion of FIGURE 1. This rigid assembly 30 then has strengthening and reinforcing metal 42 cast or flowed thereon to form the bridge 40 and the metallic portions of the pontics. The metal 42 may form the entire occlusal surfaces 43 at the top of the bridge or may be just a portion thereof with the remainder constituted by integral parts of the porcelain or plastic facings. The metal 42 also includes projections 44 facilitating the attachment of the porcelain or plastic facings 45 of the pontics by cementing, curing or baking. In adding the metal 42 to the bridge the occlusal ends of the passages 35 and slots 36 are preferably left open to facilitate cleaning.

Figure 5:
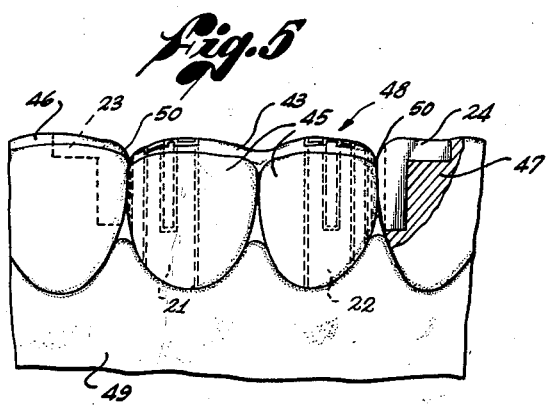
FIGURE 5 is an elevational buccal view of a dental bridge mounted in place within the patient's mouth according to the present invention.

The finished bridge is shown at 48 in FIGURE 5, mounted in the patient's mouth. The abutment teeth which support the bridge are shown at 46 and 47 having the inlays 23 and 24 permanently cemented therein. The gums of the patient wearing the bridge, as in FIGURES 5 and 7, are designated 49. It will be noted that the occlusal surfaces of the inlays 23 and 24 and of the portions 31 of the male members may be contoured as by cutting or grinding at 50 to conform to the occlusal contour of the abutment teeth 46 and 47.

It will be seen that the bridge mounting according to the present invention provides for long, wide surface contact between the fixed and removable portions of the mounting, both mesio-distally and occluso-gingivally. The attachments occluso-gingivally utilize substantially the entire length of the pontics by extending the male members 21 and 22 toward each other mesio-distally from the sides of the natural abutment teeth to substantially the centerline of the adjacent pontics. This is a major advantage over those attachment means which either effect engagement adjacent the junction of the artificial and natural teeth, or which utilize female members embedded in the abutment inlays. The large surface contacts between the male and female members minimize the lateral wear and increase the lateral strength, and also minimize the need for future tightening. The metallic portions of the mounting use less space, bucco-lingually, thereby providing more room for the plastic or porcelain facings of the pontics. The wide engagements between the male and female members of the mountings, and the long occluso-gingival length of the attachment are brought out in FIGURE 5, where it is shown that this attachment runs through the major axis of the pontic.

Figure 6:
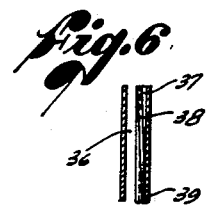
FIGURE 6 is a detail sectional view on the line 6—6 of FIGURE 3.
Figure 1A:
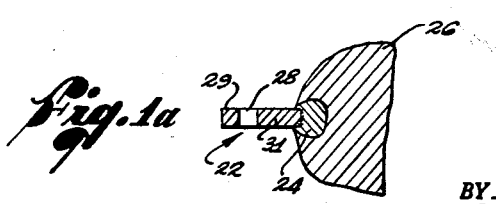
FIGURE 1a is a detail sectional view on the line 1a—1a of FIGURE 1.

Should wear occur between the cooperating surfaces of a portion 31 of a male member and a slot 36 of a female member, the strip 38 may be bent forwardly of its slots 37, as shown in FIGURE 6, to compensate for this wear and ensure a tight connection betwen the male and female members to prevent involuntary movement of the bridge.

The surfaces 51 defining the bottoms of the slots 28 are engaged by the bottom surfaces 52 of the portions of the female members abutted at 34 to provide strong stops limiting gingival movement of the bridge. This prevents the pontics or artificial teeth settling into the gum tissue to ruin the bridge and cause recession of bone and gum tissue around the necks of the natural abutment teeth.

It will be understood that the mounting according to the present invention may be used at one end only of the bridge while the other end is unsupported, as, for example, in distal extension cases; or it may be used at one end only of the bridge while other attachment means are provided for the opposite end, such as a fixed or removable clip or a direct soldering of the bridge to an inlay.

It will further be noted that when the bridge is removed the fixed attachment parts are readily accessible since they extend into free space and may be readily cleaned by a brush. The female portions of the bridge attachment may also be readily cleaned since the slot 36 is open at the edge as well as at the top and bottom, and the socket or passage 35 is open at both ends.

Also, it will be seen that a minimum space is required for the inlays or restorations in the natural abutment teeth, thus lessening the possibility of damage to the natural teeth in cutting or drilling them to receive the inlays.

Particularly where the bridge is mounted at one end only, as in distal extension cases, it is desired that stress breaking movements or stress relief be provided for. This is effected by the male member 55 of FIGURE 8 which has its slot 56 inclined at one side so as to provide a post 57 with an inner inclined or beveled side 58. This permits rocking movement of the female member cooperating with the male member 55 about a bucco-lingual axis by providing for mesio-distal relative movement between the occlusal ends of the post 57 and the socket 35 of the female member. Also, the depth of the slot 56 can be made greater than the slot 28 to space its stop surface 59 a greater distance from the occlusal surface of the bridge to provide for stress breaking, vertical movement of the bridge relative to the supporting tooth.

In the female mounting member 61 of FIGURE 9, the adjustment strip 38 and groove 37 of FIGURE 3 are replaced by a fold 62 integral with the side 63 of the female member 61. The fold 62 may be bent away from the side 63, similarly to the bending of the strip 38, to adjust for wear between the lateral engaging surfaces of the male and female members.

FIGURES 10 and 10a show cooperating male and female members 64 and 65, the latter being shown in phantom. This modification differs from the preferred form of the invention in that the portion or leg 31 of the male member 64 is provided with a concavity 66 which receives the convex portion 67 on a strip 68 located in a longitudinal groove in the female member, similarly to the mounting of the strip 38 in the groove 37. The strip 68 is soldered to the female member only adjacent its gingival end, so that it may be bent away from the female member to provide adjustment. The snapping of the convex portion 67 of the strip 68 on the female member into the concavity 66 of the male member more effectively holds the male and female members together and is of particular utility where an upper bridge is concerned, as it prevents dropping of the bridge involuntarily, by gravity.

In the modified form of female member 71 of FIGURE 11, the side of the edge slot 72 is provided with a dovetail groove 73 to receive a replaceable element 74 maintained therein by the interengaging dimples and convexities 75 on the female member and the strip. The strip 74 may be formed of any desirable material, such as metal or nylon, and may be cemented in place, if desired. In the event of wear between the slot 72 and the cooperation portion 31 of the male member, a strip 74 may be replaced with a thicker strip to compensate for the wear.

It is therefore seen that the present invention provides a dental bridge mounting having great strength and minimum wear, with engagement of the attaching elements over substantially the entire length of the pontics, and a wide engagement therebetween mesio-distally. The mounting avoids the use of complicated springs and screws, and the occlusal and gingival surfaces may be ground for fitting without interfering with the proper functioning of the mounting. It is also seen that the mounting of this invention is simple in form, easy to construct, and requires minimum space in the natural abutment teeth.

While certain preferred embodiments of the invention have been specifically illustrated and described, it will be understood that the invention is not limited thereto, as many variations will be apparent to those skilled in the art, and the invention is to be given its broadest interpretation within the terms of the following claims.

I claim:

1. A dental bridge and mounting combination comprising: a male supporting member; means adapted to mount said member on a natural tooth serving as a bridge support; a bridge including a pontic; a female member secured to said bridge and receiving said male member to mount the bridge, said male member extending mesio-distally substantially to the centerline of the pontic and occluso-gingivally substantially the full height of the pontic to provide long and wide contact between said male and female members to strengthen the bridge mounting and minimize wear between said members, the end of said bridge opposite to said female member being free to move gingivally, and said male and female members having engaging surfaces spaced apart mesio-distally to provide for rocking movement of the bridge about a bucco-lingual axis at the engagement of the male and female members.

2. A dental bridge and mounting combination comprising: a substantially U-shaped male supporting member; means adapted to mount said member on a natural tooth serving as a bridge support so that said member extends mesio-distally from said tooth with the bight of the U disposed gingivally; a bridge including a pontic; and a female member secured to said bridge and providing a substantially U-shaped socket receiving said male supporting member to support the bridge.

3. A dental bridge and mounting combination comprising: a male supporting member; means adapted to mount said member on a natural tooth serving as a bridge support, said member having a substantially U-shape and adapted to extend sidewise from said tooth for substantially one-half of a pontic width; a bridge including a pontic; and a female member rigidly secured to said bridge and receiving said male member to mount the bridge, said male member extending occluso-gingivally substantially the full height of the pontic to provide a wide and long engagement between said male and female members.

4. A dental bridge and mounting combination comprising: a male supporting member; means adapted to mount said member on a natural tooth serving as a bridge support, said member having a substantially U-shape and adapted to extend sidewise from said tooth for substantially one-half of a pontic width; a bridge including a pontic; and a female member rigidly secured to said bridge and receiving said male member to mount the bridge, said male member extending occluso-gingivally substantially the full height of the pontic to provide a wide and long engagement between said male and female members, said male and female members including positive stop means preventing gingival movement of the bridge and settling of the pontic into the gum tissue.

5. A dental bridge and mounting combination comprising: a male supporting member; means adapted to mount said member on a natural tooth serving as a bridge support, said member having a substantially U-shape and adapted to extend sidewise from said tooth for substantially one-half of a pontic width; a bridge including a pontic; a female member rigidly secured to said bridge and receiving said male member to mount the bridge, said male member extending occluso-gingivally substantially the full height of the pontic to provide a wide and long engagement between said male and female members; and adjustable means on one of said members and engageable with a lateral face on the other member to compensate for wear between the laterally engaging surfaces on the members.

6. A dental bridge and mounting combination comprising: a male supporting member; means adapted to mount said member on a natural tooth serving as a bridge support, said member having a substantially U-shape and adapted to extend sidewise from said tooth for substantially one-half of a pontic width; a bridge including a pontic; a female member rigidly secured to said bridge and receiving said male member to mount the bridge, said male member extending occluso-gingivally substantially the full height of the pontic to provide a wide and long engagement between said male and female members; and a bendable strip on said female member engaging a side face on said male member to compensate for wear between the laterally engaging surfaces on the members.

7. A dental bridge and mounting combination comprising: a male supporting member of substantially U-shape having one leg thereof adapted to be edgewise connected to an inlay mountable in a natural tooth serving as a bridge support, the bight of said U being disposed gingivally; a pontic supporting bridge; and a female member secured to said bridge and providing a substantially U-shaped socket to receive said U-shaped supporting member, the leg of said socket receiving the inlay engaging leg of the U being open at the side and presenting opposed lateral surfaces engaging the opposite lateral surfaces on said engaging leg.

8. A dental bridge and mounting combination comprising: a male supporting member of substantially U-shape having one leg thereof adapted to be edgewise connected to an inlay mountable in a natural tooth serving as a bridge support, the bight of said U being disposed gingivally; a pontic suporting bridge; and a female member secured to said bridge and providing a substantially U-shaped socket to receive said U-shaped supporting member, the leg of said socket receiving the free leg of said U being located adjacent to the centerline of the pontic and extending throughout the height thereof and providing a long engagement between said male and female members.

9. A dental bridge and mounting combination comprising: a male supporting member of substantially U-shape having one leg thereof adapted to be edgewise connected to an inlay mountable in a natural tooth serving as a bridge support, the bight of said U being disposed gingivally; a pontic supporting bridge; a female member integral with said bridge and providing a substantially U-shaped socket to receive said U-shaped supporting member, the leg of said socket receiving the inlay engaging leg of the U being open at the side, the leg of said socket receiving the free leg of said U being located adjacent to the centerline of the pontic and extending throughout the height thereof and providing a long engagement between said male and female members; and an adjustable member in a wall of said socket engaging the attached leg of said male member whereby to compensate for wear between the laterally engaging surfaces of said male and female members.

10. A dental bridge and mounting combination comprising: a male supporting member of substantially U-shape having one leg thereof adapted to be edgewise connected to an inlay mountable in a natural tooth serving as a bridge support, the bight of said U being disposed gingivally; a pontic supporting bridge; a female member integral with said bridge and providing a substantially U-shaped socket to receive said U-shaped supporting member, the leg of the socket receiving the inlay engaging leg of the U being open at the side, the leg of said socket receiving the free leg of said U being located adjacent to the centerline of the pontic and extending throughout the height thereof and providing a long engagement between said male and female members; and an adjustable member in a wall of said socket engaging the attached leg of said male member whereby to compensate for wear between the lateral engaging surfaces of said male and female members, said last mentioned means including a readily replaceable strip releasably mounted in the socket wall.

11. A dental bridge and mounting combination comprising: a male supporting member of substantially U-shape having one leg thereof adapted to be edgewise connected to an inlay mountable in a natural tooth serving as a bridge support, the bight of said U being disposed gingivally; a pontic supporting bridge; and a female member integral with said bridge and providing a substantially U-shaped socket to receive said U-shaped supporting member, the leg of the socket receiving the inlay engaging leg of the U being open at the side, the unattached leg on said male member and the socket leg receiving it being relatively tapered toward their occlusal ends to provide for rocking, stress relieving movement of said bridge relative to said supporting tooth.

12. A dental bridge and mounting combination comprising: a male supporting member of substantially U-shape having one leg thereof adapted to be edgewise connected to an inlay mountable in a natural tooth serving as a bridge support, the bight of said U being disposed gingivally; a pontic supporting bridge; and a female member integral with said bridge and providing a substantially U-shaped socket to receive said U-shaped supporting member, the leg of the socket receiving the inlay engaging leg of the U being open at the side, the leg of said socket receiving the free leg of said U being located adjacent to the centerline of the pontic and extending throughout the height thereof and providing a long engagement between said male and female members, the bights of said male member and of the socket receiving the same being spaced when the occlusal surfaces of said pontic and tooth are aligned to provide for stress relieving movement of the bridge relative to the supporting tooth but engaging after limited movement of the bridge to supply a positive support to prevent further movement of the pontic into the gums.

13. A dental bridge and mounting combination comprising: a male supporting member of substantially U-shape having one leg thereof adapted to be edgewise connected to an inlay mountable in a natural tooth serving as a bridge support, the bight of said U being disposed gingivally; a pontic supporting bridge; a female member integral with said bridge and providing a substantially U-shaped socket to receive said U-shaped supporting member, the edge of the socket receiving the inlay engaging leg of the U being open at the side, the leg of said socket receiving the free leg of said U being located adjacent to the centerline of the pontic and extending throughout the height thereof and providing a long engagement between said male and female members; and interlocking means on cooperating surfaces of said male and female members of concave-convex conformation interengaging to hold said bridge in position against involuntary removal.

References Cited in the file of this patent

UNITED STATES PATENTS

| | | |
|---|---|---|
| 1,302,499 | Bennett | May 6, 1919 |
| 1,990,532 | Ecker | Feb. 12, 1935 |